(12) United States Patent
Kurokawa

(10) Patent No.: US 10,288,125 B2
(45) Date of Patent: May 14, 2019

(54) TORQUE TRANSMISSION UNIT

(71) Applicant: NSK LTD., Tokyo (JP)

(72) Inventor: Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 310 days.

(21) Appl. No.: 15/122,359

(22) PCT Filed: Jan. 9, 2015

(86) PCT No.: PCT/JP2015/050534
§ 371 (c)(1),
(2) Date: Aug. 29, 2016

(87) PCT Pub. No.: WO2015/136951
PCT Pub. Date: Sep. 17, 2015

(65) Prior Publication Data
US 2016/0369849 A1    Dec. 22, 2016

(30) Foreign Application Priority Data

Mar. 14, 2014  (JP) .................................. 2014-052423
Jun. 17, 2014  (JP) .................................. 2014-124442

(51) Int. Cl.
*F16D 3/38* (2006.01)
*B62D 1/20* (2006.01)
(Continued)

(52) U.S. Cl.
CPC .............. *F16D 3/387* (2013.01); *B62D 1/16* (2013.01); *B62D 1/20* (2013.01); *F16D 1/0864* (2013.01); *F16D 1/0894* (2013.01); *F16D 3/10* (2013.01)

(58) Field of Classification Search
CPC ........... B62D 1/16; B62D 1/20; F16D 1/0864; F16D 1/0894; F16D 3/382; F16D 3/387;
(Continued)

(56) References Cited

U.S. PATENT DOCUMENTS 5,312,199 A      5/1994 Smith, Jr.
7,445,242 B2 *  11/2008 Yamaguchi .............. B62D 1/16
                                                               280/779

(Continued)

FOREIGN PATENT DOCUMENTS

CN    101522503 A    9/2009
CN    102112363 A    6/2011
(Continued)

OTHER PUBLICATIONS

Communication dated Apr. 24, 2017 issued by the European Patent Office in counterpart European Patent Application No. 15761318.3.
(Continued)

*Primary Examiner* — Josh Skroupa
(74) *Attorney, Agent, or Firm* — Sughrue Mion, PLLC

(57) ABSTRACT

A state where the connecting pin is laid across between at least one of the outer diameter side through-holes and the inner diameter side through-hole is maintained by an axial displacement of the connecting pin with respect to the outer diameter side through-hole and the inner diameter side through-hole being regulated based on an engagement between both edges of the connecting pin and a displacement-regulating portion which is a part of the yoke or the bolt.

4 Claims, 22 Drawing Sheets

(51) Int. Cl.
*B62D 1/16* (2006.01)
*F16D 1/08* (2006.01)
*F16D 3/10* (2006.01)

(58) Field of Classification Search
CPC ......... Y10T 403/4614; Y10T 403/4617; Y10T 403/7182; Y10T 403/7188
USPC ........ 464/134, 135, 182; 403/235, 236, 398, 403/399
See application file for complete search history.

(56) References Cited

U.S. PATENT DOCUMENTS

| | | | |
|---|---|---|---|
| 9,382,949 B2* | 7/2016 | Nishitani | F16D 1/0864 |
| 2005/0218642 A1 | 10/2005 | Yamaguchi et al. | |
| 2011/0120798 A1 | 5/2011 | Kawada et al. | |
| 2014/0190762 A1 | 7/2014 | Kiyota et al. | |

FOREIGN PATENT DOCUMENTS

| | | |
|---|---|---|
| DE | 41 29 042 A1 | 3/1993 |
| EP | 2 308 743 A1 | 4/2011 |
| FR | 2 891 037 A1 | 3/2007 |
| JP | 2009-85284 A | 4/2009 |
| JP | 2011-214685 A | 10/2011 |
| JP | 2012-96681 A | 5/2012 |
| JP | 2013-71590 A | 4/2013 |

OTHER PUBLICATIONS

Communication dated Apr. 7, 2015 issued by International Searching Authority in counterpart International Application No. PCT/JP2015/050534 (PCT/ISA/210).

Office Action dated Feb. 8, 2018 issued by the State Intellectual Property Office of P.R. China in counterpart Chinese Patent Application No. 201580011857.6.

* cited by examiner

TORQUE TRANSMISSION UNIT

TECHNICAL FIELD

The present invention relates to a torque transmission unit that is used by being incorporated into an electric or hydraulic power steering device, which is formed by a combination of a torque transmission shaft and a torsion bar with respective one edges connected to each other by a connecting pin and a yoke for a universal joint.

BACKGROUND ART

FIGS. 19 and 20 show an example of an electric power steering device that is known as the prior art and disclosed in Patent Document 1 or the like. In the case of the electric power steering device, a steering shaft 2 that has a rear edge to which a steering wheel 1 is fixed is rotatably supported inside a cylindrical steering column 3 A movement of the steering wheel 1 during steering is transmitted to an input shaft 8 of a steering gear unit 7 via the steering shaft 2, an electric assist device 4, a universal joint 5a, an intermediate shaft 6, and another universal joint 5b. When the input shaft 8 rotates, a pair of tie rods 9 and 9 that are placed on both sides of the steering gear unit 7 are pushed and pulled, and a steering angle in accordance with an operation amount of the steering wheel 1 is applied to a pair of left and right steering wheels.

In the present specification, a longitudinal direction is a traveling direction of a car. In all the drawings except for FIGS. 2, 6, 11, and 16 to 18, the left side is a "front side" and the right side is a "rear side".

As illustrated in FIG. 20, the electric assist device 4 is provided with an electric motor 10 that is an auxiliary power source, a metallic housing 11 that supports the electric motor 10, and an output shaft 12 as a torque transmission shaft, a torsion bar 13, a torque detector 14, and a worm-type speed reducer 15 that are placed inside the metallic housing 11.

The housing 11 is formed by a lid 16 on the front side and a main body 17 on the rear side being coupled with each other by a plurality of bolts 18 and 18 and is coupled with and fixed to a front edge of the steering column 3. A front edge of the steering shaft 2 is inserted into the housing 11.

The output shaft 12 is formed of steel and has a hollow shape, and is rotatably supported by a pair of ball bearings 19 and 20 on a front side of the steering shaft 2 in the housing 11. A front edge of the output shaft 12 that protrudes from a front end opening of the housing 11 is coupled with the universal joint 5a (refer to FIG. 19).

The torsion bar 13 is formed of steel such as spring steel, and is inserted into a inner diameter side of the output shaft 12. In this state, a rear edge of the torsion bar is press-fitted into a coupling hole portion 21 disposed on a inner diameter side of the steering shaft 2, and is connected to be capable of torque transmission to the steering shaft 2. A front edge of the torsion bar 13 is connected to be capable of torque transmission to the output shaft 12 by a connecting pin 22 in a state of being internally fitted into the front edge of the output shaft 12. Specifically, outer diameter side through-holes 23 and 23 are formed at two positions that are sides of the front edge of the output shaft 12 opposite to each other in the radial direction, and an inner diameter side through-hole 24 are formed at the front edge of the torsion bar 13. The through-holes 23 and 23 and the inner diameter side through-hole 2 4 are formed concentrically to each other and in a radial direction. The connecting pin 22 is press-fitted inside each of the outer diameter side and inner diameter side through-holes 23 and 24 in a state of being laid across between the respective outer diameter side and inner diameter side through-holes 23 and 24.

The torque detector 14 is provided with an uneven portion 25 for torque detection, a sleeve 26 for torque detection, and a coil unit 27 for torque detection. The uneven portion 25 for torque detection is disposed at a part close to a rear end of an outer peripheral surface of the output shaft 12. The sleeve 26 for torque detection is supported by and fixed to the front edge of the steering shaft 2 in a state of being placed around the uneven portion 25 for torque detection. The coil unit 27 for torque detection is supported by and fixed to the housing 11 in a state of being placed around the sleeve 26 for torque detection.

The worm-type speed reducer 15 is formed by a combination of a worm wheel 28 and a worm (not illustrated). The worm wheel 28 is externally fitted into and fixed to a substantially central portion in an axial direction that is a part of the output shaft 12 between the ball bearings 19 and 20. The worm is rotatably supported in the housing 11 in a state of meshing with the worm wheel 28. A base edge of the worm is coupled with an output shaft of the electric motor 10 to be capable of torque transmission.

In the case of the electric power steering device configured as described above, the torsion bar 13 is elastically twisted in accordance with the direction and magnitude of the torque that is a steering force which is applied from the steering wheel 1 to the steering shaft 2. As a result, a positional relationship of the uneven portion 25 for torque detection and the sleeve 26 for torque detection in a circumferential direction is changed, and thus a coil that constitutes the coil unit 27 for torque detection undergoes a change in impedance. Accordingly, the direction and magnitude of the torque can be detected based on this impedance change. The electric motor 10 generates auxiliary power in accordance with the direction and magnitude of the torque. This auxiliary power is applied to the output shaft 12 after being increased by the worm-type speed reducer 15. As a result, a force that is required for a driver's operation of the steering wheel 1 is reduced.

In the case of the electric power steering device described above, a base portion 31 of a yoke 29 is externally fitted into and fixed to the front edge of the output shaft 12 as illustrated in, for example, FIG. 21. The base portion 31 has a partially cut cylindrical shape, and the yoke 29 is one of a pair of yokes 29 and 30 that constitute the universal joint 5a.

In the case of the external fitting and fixing described above, one edge of the connecting pin 22 might reach a position within a range of a discontinuous portion (slit) 33 that is formed in the base portion 31 of the yoke 29 as in the case of the structure which is illustrated in FIG. 21. In this case, the possibility of a displacement of the connecting pin 22 with respect to the output shaft 12a in the axial direction of the connecting pin 22 resulting from repeated use of the torque transmission unit cannot be ruled out provided that a width dimension of the discontinuous portion 33 exceeds a diameter dimension of the connecting pin 22. Accordingly, there is room for improvement.

In the case of the structure that is illustrated in FIG. 22, both edges of the connecting pin 22 remain hidden by an inner diameter side of the base portion 31. Accordingly, in a stage after the yoke 29 is coupled with and fixed to the front edge of the output shaft 12 during an inspection at an assembly line, for example, it cannot be visually confirmed (or an image diagnosis-based confirmation after camera-based imaging cannot be carried out) from the outside of the yoke 29 whether or not the connecting pin 22 is installed inside each of the outer diameter side and inner diameter side through-holes 23 and 24. In other words, the confirmation of whether or not the connecting pin 22 is installed has to be performed in a stage before the yoke 29 is coupled with and fixed to the front edge of the output shaft 12. Accordingly, there is room for improvement.

PRIOR ART DOCUMENT

Patent Document

Patent Document 1: JP-A-2013-71590

SUMMARY OF THE INVENTION

Problem to be Solved

The present invention has been made in view of the above-described circumstances, and an object thereof is to provide a torque transmission unit that can reliably regulate an axial displacement of a connecting pin which connects one edge of a torque transmission shaft and one edge of a torsion bar to each other.

Means for Solving the Problem

A torque transmission unit of the present invention includes: a torque transmission shaft formed to have a hollow shape and including outer diameter side through-holes formed concentrically to each other and in a radial direction at two positions of one edge on sides opposite to each other in the radial direction; a torsion bar inserted into an inner diameter side of the torque transmission shaft and including a inner diameter side through-hole formed in the radial direction at a position aligned with the outer diameter side through-hole on the one edge; a connecting pin inserted into the outer diameter side through-hole and the inner diameter side through-hole in a state of being laid across between the outer diameter side through-hole and the inner diameter side through-hole; a yoke including a base portion having a discontinuous portion at one place in a circumferential direction and having a partially cut cylindrical shape, the base portion having a pair of flange portions formed at a position where the discontinuous portion is pinched and a pair of mounting holes formed at positions aligned with the pair of flange portions; and a bolt inserted into or screwed with the mounting hole and narrowing a width of the discontinuous portion in a state where the base portion of the yoke is externally fitted into the one edge of the torque transmission shaft such that the base portion is coupled with and fixed to the one edge of the torque transmission shaft.

The insertion of the connecting pin into the outer and inner diameter side through-holes may be press-fitting with interference between fitting surfaces or just an insertion without interference between fitting surfaces.

The insertion of the bolt into the mounting hole or the screwing of the bolt with the mounting hole may be such that the bolt is inserted into a through hole which is a pair of the mounting holes and further fastened with a nut that is screwed with a tip portion, or the bolt is inserted into a through hole which is one mounting hole, screwed with a thread hole which is the other mounting hole, and further fastened.

In especially the torque transmission unit of the present invention, a state where the connecting pin is laid across between at least one of the outer diameter side through-holes and the inner diameter side through-hole is maintained by an axial displacement of the connecting pin with respect to the outer diameter side through-hole and the inner diameter side through-hole being regulated based on an engagement between both edges of the connecting pin and a displacement-regulating portion which is a part of the yoke or the bolt.

In a case where the present invention is carried out, for example, at least one of the edges of the connecting pin may be present at a position visible from an outside of the yoke.

In a case where the present invention is carried out, for example, the displacement-regulating portion with respect to the one edge of the connecting pin may be an inner peripheral surface of the base portion or a rod portion of the bolt, and the displacement-regulating portion with respect to the other edge of the connecting pin may be the inner peripheral surface of the base portion, and a state where the connecting pin is laid across between the outer diameter side through-hole and the inner diameter side through-hole may be maintained by an axial displacement of the connecting pin with respect to the outer diameter side through-hole and the inner diameter side through-hole being regulated based on an engagement between both edges of the connecting pin and both of the displacement-regulating portions.

In a case where the present invention is carried out, for example, a width dimension of the discontinuous portion of the base portion may be smaller than a diameter dimension of the connecting pin.

In addition, in a case where the present invention is carried out, for example, the one edge of the connecting pin may be present at a position visible through the discontinuous portion from the outside of the yoke Effects of Invention In the case of the torque transmission unit according to the present invention that is configured as described above, the state where the connecting pin is laid across between at least one of the outer diameter side through-holes and the inner diameter side through-hole can be maintained based on the engagement between both of the edge of the connecting pin and a pair of the displacement-regulating portions. Accordingly, a state where the one edge of the torque transmission shaft and one edge of the torsion bar are connected to each other to be capable of torque transmission by the connecting pin can be maintained despite repeated use.

DESCRIPTION OF EMBODIMENTS

First Embodiment

Figure 19:
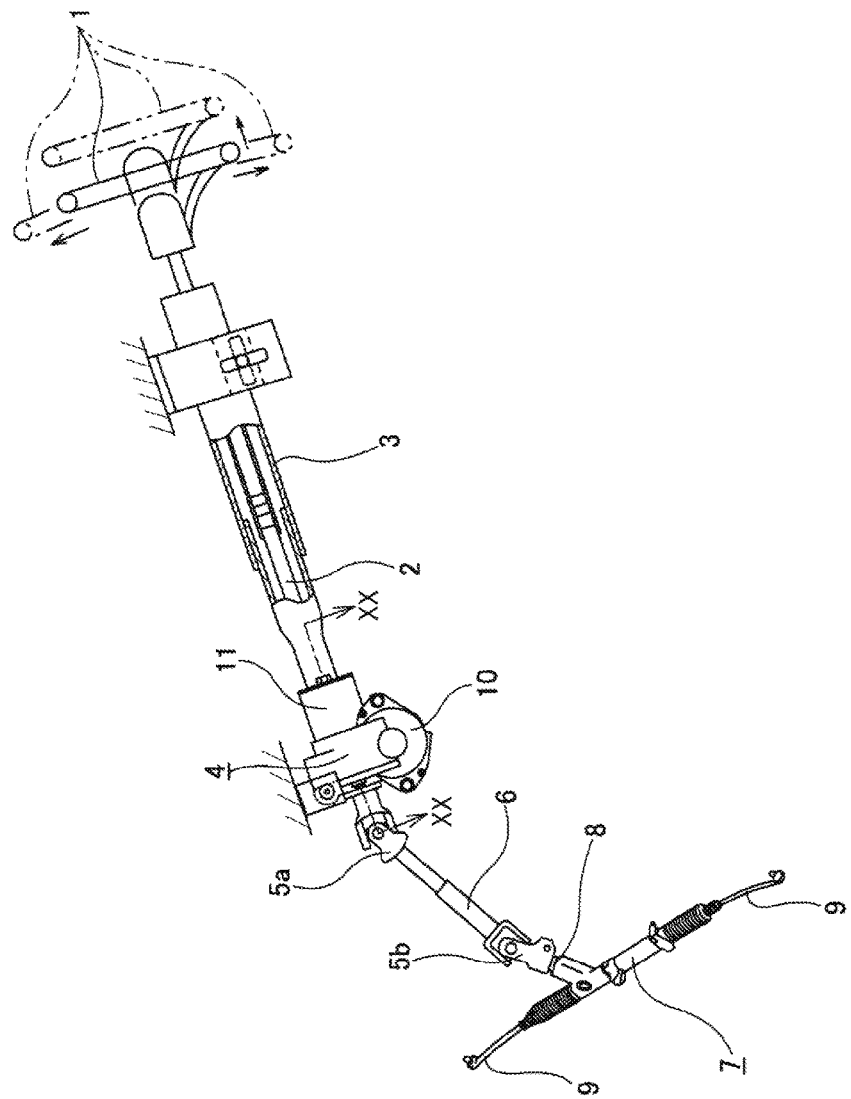
FIG. 19 is a partially cut side view illustrating an example of an electric power steering device known as the prior art.
Figure 20:
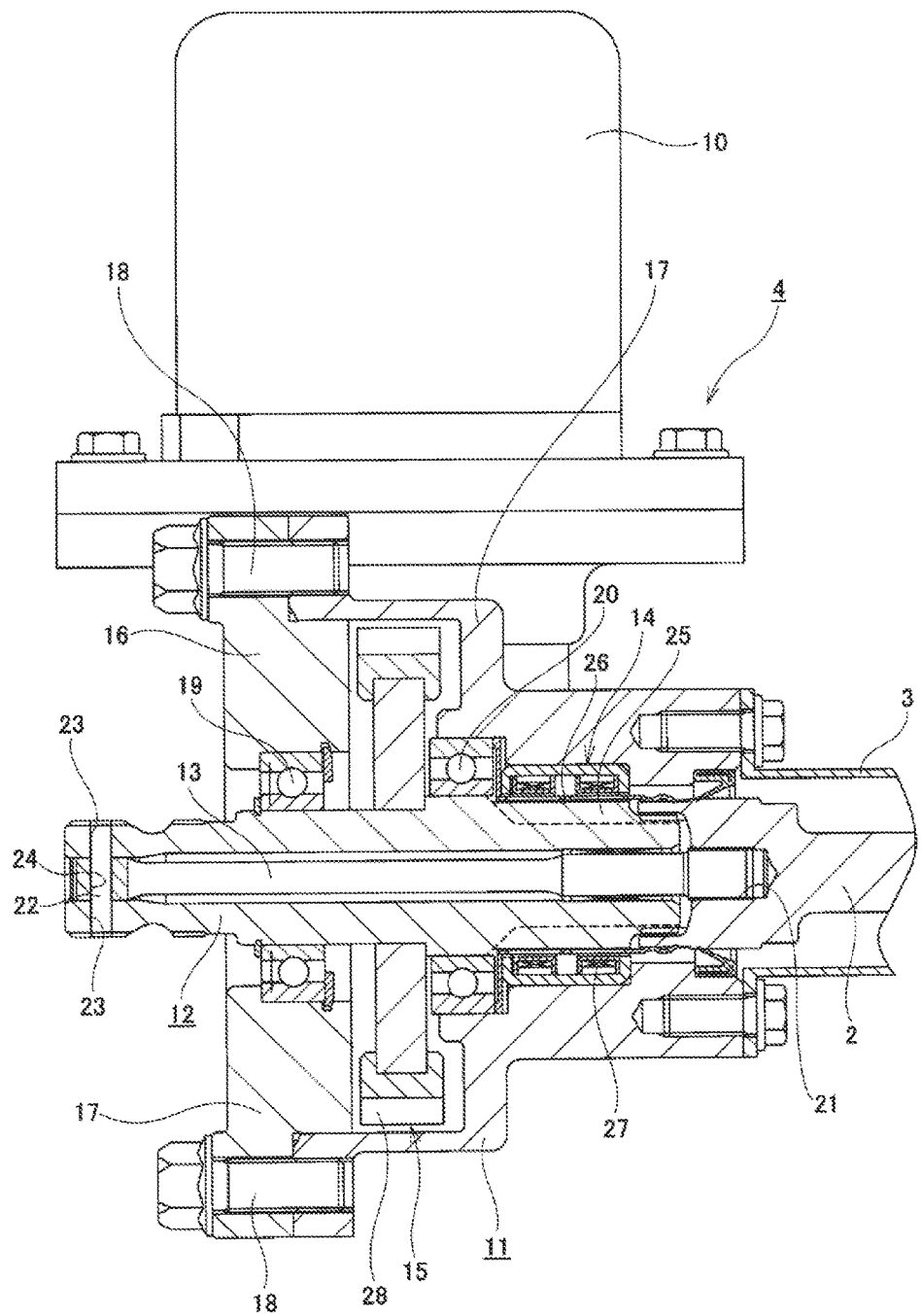
FIG. 20 is a cross sectional view taken along line XX-XX in FIG. 19.
Figure 21:
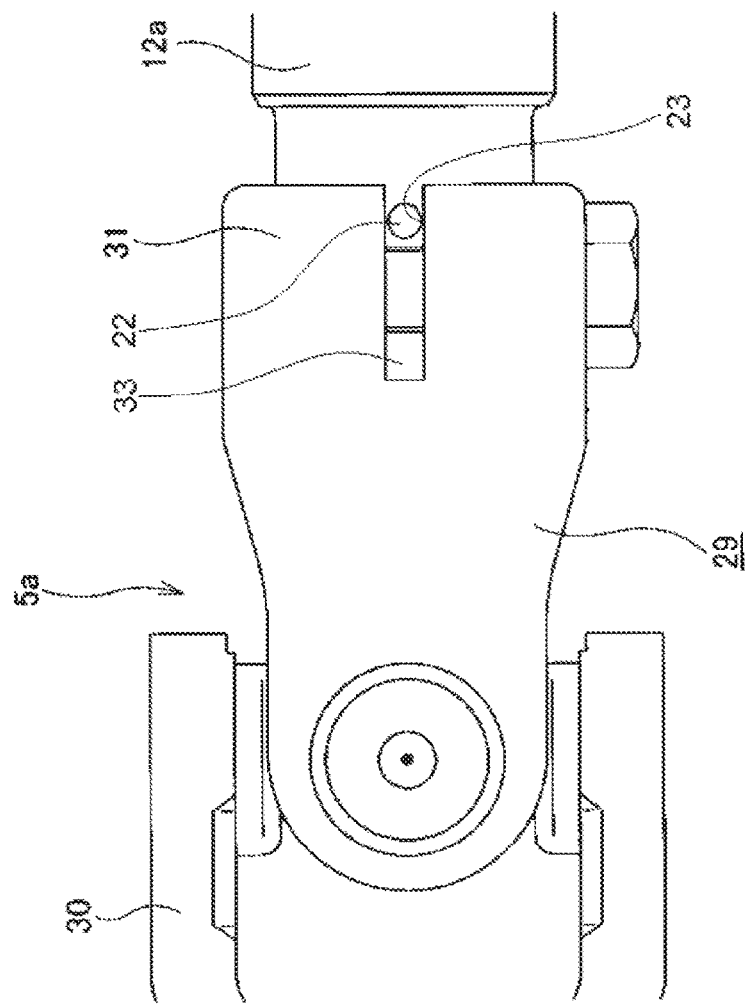
FIG. 21 is a plan view illustrating a joint of a front edge of an output shaft of an electric assist device and a yoke of a universal joint relating to a structure according to the prior art.
Figure 22:
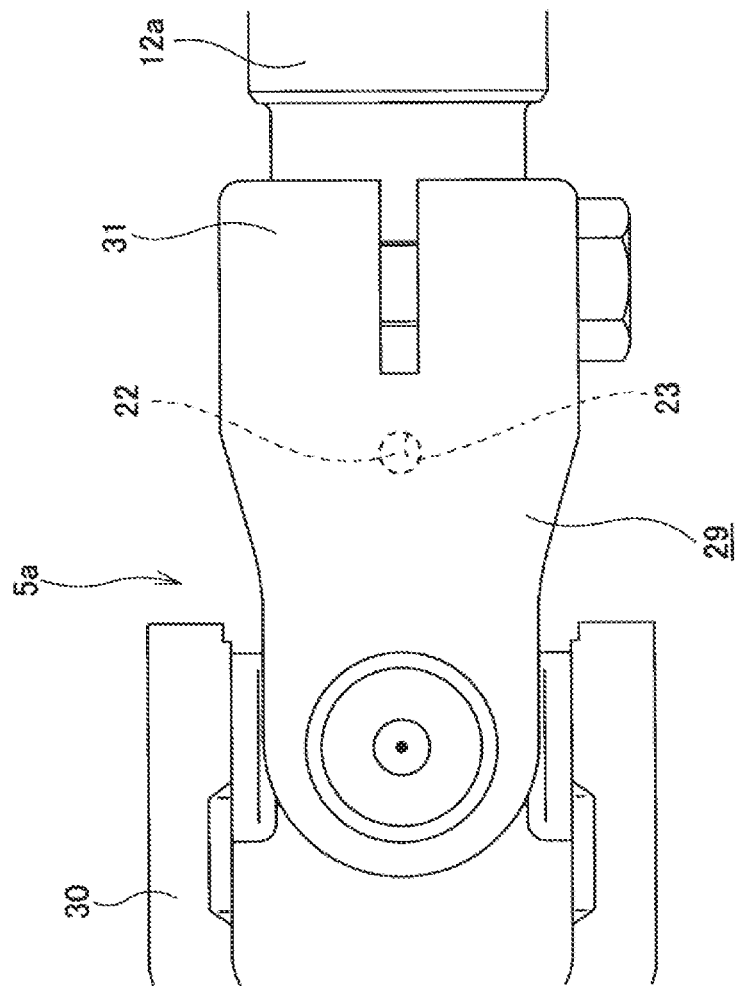
FIG. 22 is a plan view illustrating another joint of a front edge of an output shaft of an electric assist device and a yoke of a universal joint relating to the structure according to the prior art.

A first embodiment of the present invention will be described with reference to FIGS. 1 to 4. This embodiment is characterized by a joint of a front edge of an output shaft 12a, which is a torque transmission shaft and constitutes an electric assist device, and one yoke 29a constituting a universal joint 5a. Structures and effects of the other parts are similar to those of the structure according to the prior art that is illustrated in FIGS. 19 and 20, and thus the following description will focus on characteristic parts of this embodiment and those not described above with the illustration and description of the identical pans omitted or simplified if possible.

In the case of this embodiment, the output shaft 12a is formed of steel and has a hollow shape and a torsion bar 13 formed of steel such as spring steel is inserted into an inner diameter side of the output shaft 12a as in the case of the structure according to the prior art described above. The torsion bar 13 is connected to be capable of transmitting torque to the output shaft 12a by a connecting pin 22 in a state where a front edge of the torsion bar 13 is internally fitted into the front edge of the output shaft 12a. Specifically, outer diameter side through-holes 23 and 23 are formed at two positions that are sides of the front edge of the output shaft 12a opposite to each other in the radial direction, and an inner diameter side through-hole 24 are formed at the front edge of the torsion bar 13. The through-holes 23 and 23 and the inner diameter side through-hole 24 are formed concentrically to each other and in a radial direction. In a state where the connecting pin 22 is laid across between the respective outer diameter side and inner diameter side through-holes 23 and 24, the connecting pin 22 is press-fitted inside each of the outer diameter side and inner diameter side through-holes 23 and 24.

The yoke 29a, which is one of a pair of yokes 29a and 30 constituting the universal joint 5a, is coupled with and fixed to the front edge of the output shaft 12a to be capable of torque transmission. The yoke 29a is metallic and is provided with a base portion 31a and a pair of arm portions 32 and 32 extending from an axial tip portion of the base portion 31a. The base portion 31a has a discontinuous portion (slit) 33 disposed in one place in a circumferential direction. Accordingly, the base portion 31a is formed in a partially cut cylindrical shape, and an inner diameter thereof can be expanded and contracted. In the base portion 31a, a pair of flange portions 34a and 34b that face each other are formed at positions where the discontinuous portion 33 is pinched. In the flange portion 34a, a through-hole 35 that is one mounting hole is formed with a positional relationship which is torsional with respect to a central axis of the base portion 31a. In the other flange portion 34b, a screw hole 36 that is the other mounting hole is formed at a position aligned with the through-hole 35.

When the front edge of the output shaft 12a is inserted into the inner diameter side of the base portion 31a, a male serration portion 37 that is formed on an outer peripheral surface of the front edge of the output shaft 12a is engaged with a female serration portion 38 that is formed on an inner peripheral surface of the base portion 31a. In this state, a bolt 39 that is inserted into the through-hole 35 is screwed with the screw hole 36 and is further tightened. Then, the base portion 31a is coupled with and fixed to the front edge of the output shaft 12a by a width dimension of the discontinuous portion 33 being decreased and the base portion 31a being reduced in diameter.

The width dimension $W_{33}$ of the discontinuous portion 33 in this state is less than a diameter dimension $D_{22}$ of the connecting pin 22 ($W_{33} < D_{22}$). In the case of the structure that is illustrated in the drawing, a locking groove 40 is formed over an entire circumference in an axial intermediate portion of the male serration portion 37 on the outer peripheral surface of the front edge of the output shaft 12a, and a rod portion of the bolt 39 is engaged with the locking groove 40. Then, axial positioning of the yoke 29a with respect to the front edge of the output shaft 12a is attempted, and the output shaft 12a and the yoke 29a can be prevented from being separated from each other in an axial direction even in a case where the tightening of the bolt 39 is loosened.

In addition, in the case of this embodiment, dimensions of the respective portions and assembly positions of the respective members in relation to the axial direction and the circumferential direction are regulated such that the connecting pin 22 is present between a front end edge of the discontinuous portion 33 and the bolt 39 in relation to the axial direction of the base portion 31a and one edge of the connecting pin 22 (paper front side edge in FIG. 1 and right edge in FIG. 2) is present at a position of the same phase as the discontinuous portion 33 in relation to the circumferential direction of the base portion 31a in this state. Accordingly, the one edge of the connecting pin 22 is visible (can be imaged by a camera) through the discontinuous portion 33 from the outside of the yoke 29a.

In the case of a torque transmission unit according to this embodiment that is configured as described above, the one edge of the connecting pin 22 is present at a position visible through the discontinuous portion 33 from the outside of the yoke 29a. Accordingly, during an inspection at an assembly line, for example, it can be confirmed whether or not the connecting pin 22 is press-fitted inside each of the outer diameter side and inner diameter side through-holes 23 and 24, even in a stage after the base portion 31a of the yoke 29a is externally fitted into and fixed to the front edge of the output shaft 12a, based on the visual confirmation of the presence of the one edge of the connecting pin 22 through the discontinuous portion 33 from the outside of the yoke 29a (or an image diagnosis-based confirmation after the camera-based imaging).

In the case of this embodiment, the connecting pin 22 is press-fitted inside each of the outer diameter side and inner diameter side through-holes 23 and 24, and thus a large frictional force acts between an outer peripheral surface of the connecting pin 22 and an inner peripheral surface of each of the outer diameter side and inner diameter side through-holes 23 and 24. Accordingly, an axial displacement of the connecting pin 22 with respect to each of the outer diameter side and inner diameter side through-holes 23 and 24 can be sufficiently suppressed by the large frictional force. In addition, even in a case where the connecting pin 22 tends to be axially displaced with respect to each of the outer diameter side and inner diameter side through-holes 23 and 24 due to repeated use, this axial displacement can be restricted to a sufficiently narrow range in the case of this embodiment.

In other words, in the case of this embodiment, the width dimension $W_{33}$ of the discontinuous portion 33 is less than the diameter dimension $D_{22}$ of the connecting pin 22 ($W_{33}<D_{22}$), and thus the one edge of the connecting pin 22 abuts against or faces in close proximity the inner peripheral surface of the base portion 31a at parts adjacent to both circumferential sides of the discontinuous portion 33. The other edge of the connecting pin 22 (paper back side edge in FIG. 1 and left edge in FIG. 2) abuts against or faces in close proximity a part of the inner peripheral surface of the base portion 31a that is diametrically opposite to the discontinuous portion 33. Accordingly, even in a case where the connecting pin 22 tends to be axially displaced with respect to each of the outer diameter side and inner diameter side through-holes 23 and 24, the axial displacement of the connecting pin 22 with respect to each of the outer diameter side and inner diameter side through-holes 23 and 24 can be restricted to a sufficiently narrow range based on an engagement between both of the edges of the connecting pin 22 and displacement-regulating portions that are parts of the inner peripheral surface of the base portion 31a (pans abutting against or facing in close proximity both of the edges). Specifically, in the case of this embodiment, the axial displacement of the connecting pin 22 can be restricted to a range in which a state where the connecting pin 22 is laid across in each of the outer diameter side and inner diameter side through-holes 23 and 24 is maintained. Accordingly, despite repeated use, a state can be maintained where the front edge of the output shaft 12a and the front edge of the torsion bar 13 are connected to each other to be capable of torque transmission by the connecting pin 22.

In the case of this embodiment, the one edge of the connecting pin 22 is set to be present at the position of the same phase as the discontinuous portion 33 in relation to the circumferential direction of the base portion 31a. However, the connecting pin 22 and the discontinuous portion 33 do not have to be in the same phase when the connecting pin 22 does not have to be visually observed from the outside of the yoke 29a.

In this case, the connecting pin 22 and the discontinuous portion 33 do not have to be in the same phase, and thus a process for connecting the front edge of the output shaft 12a and the front edge of the torsion bar 13 to each other can be performed within a short period of time.

Even when the phases of the connecting pin 22 and the discontinuous portion 33 are random and the phases of the connecting pin 22 and the discontinuous portion 33 match each other, the axial displacement of the connecting pin 22 can be suppressed since the width dimension of the discontinuous portion 33 is set to be less than the diameter dimension of the connecting pin 22.

Second Embodiment

Figure 1:
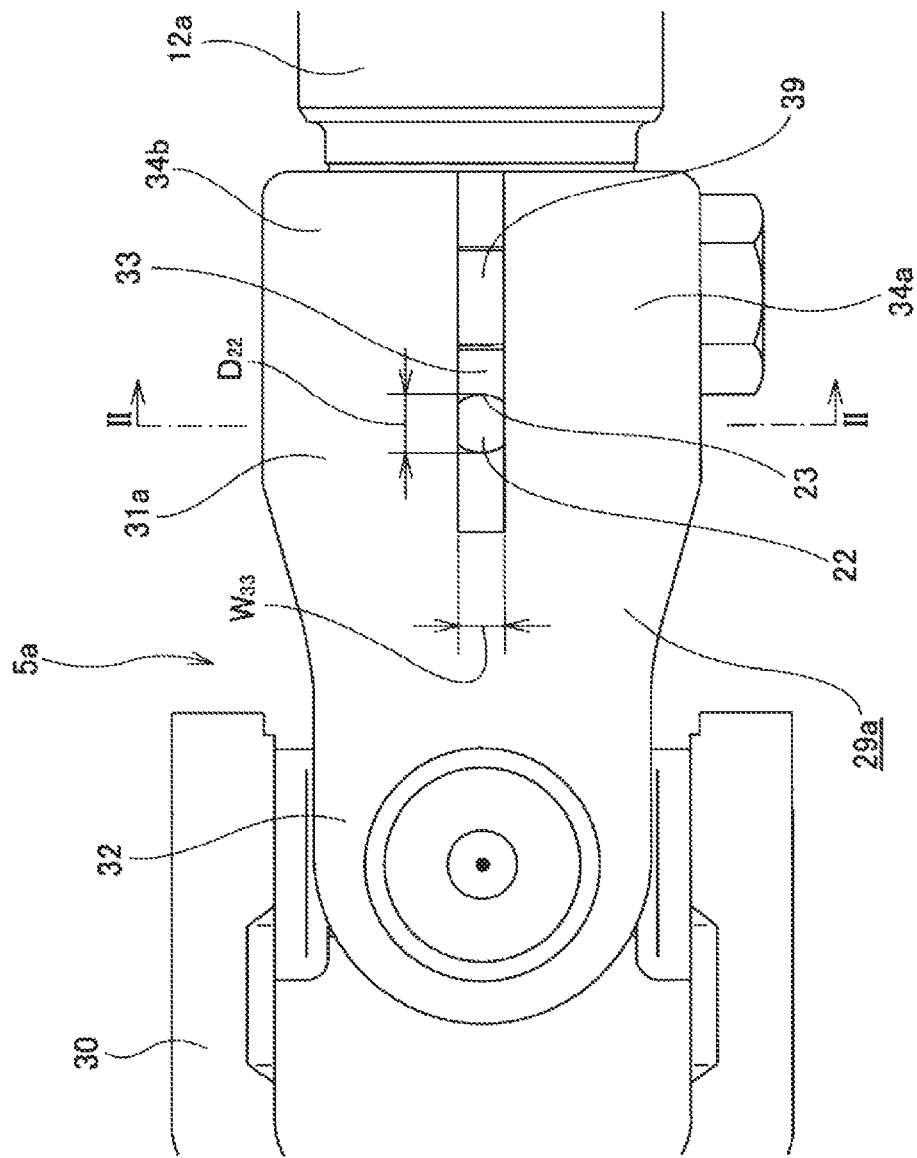
FIG. 1 is a plan view illustrating a joint of a front edge of an output shaft of an electric assist device and a yoke of a universal joint, which is a main section of a first embodiment of the present invention.
Figure 2:
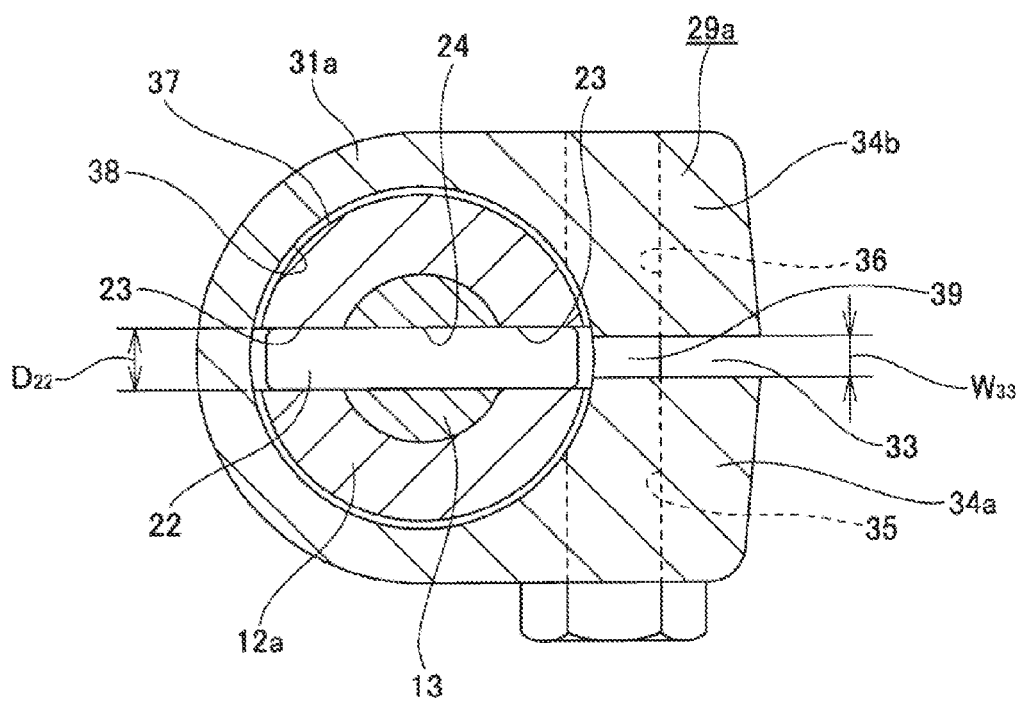
FIG. 2 is a cross sectional view taken along line II-II in FIG. 1.
Figure 3:
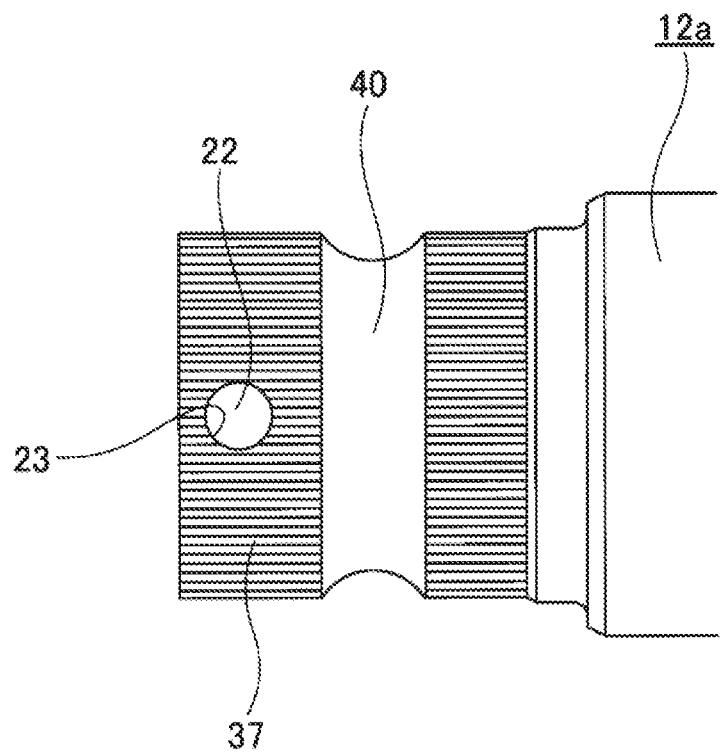
FIG. 3 is a plan view of the front edge of the output shaft.
Figure 4:
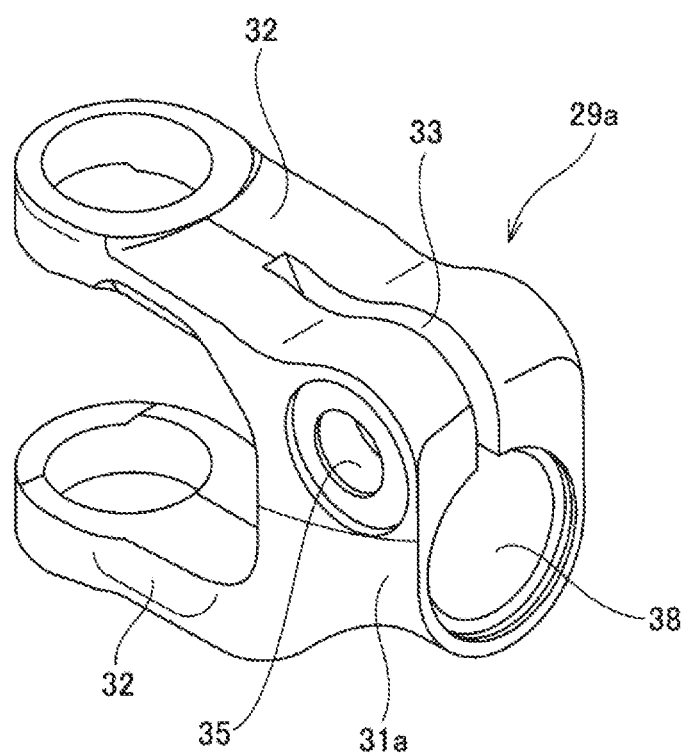
FIG. 4 is a perspective view of one yoke constituting the universal joint.
Figure 5:
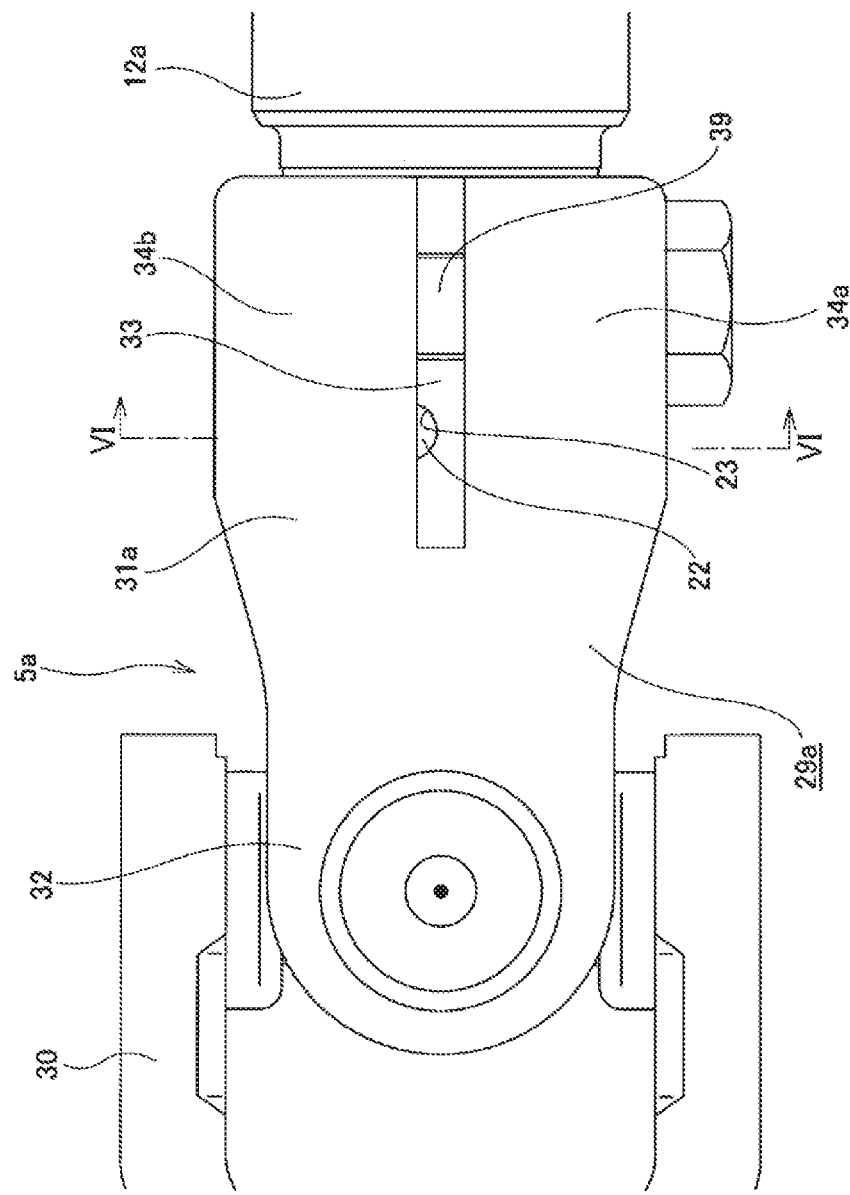
FIG. 5 is a drawing illustrating a second embodiment of the present invention, which is similar to FIG. 1.
Figure 6:
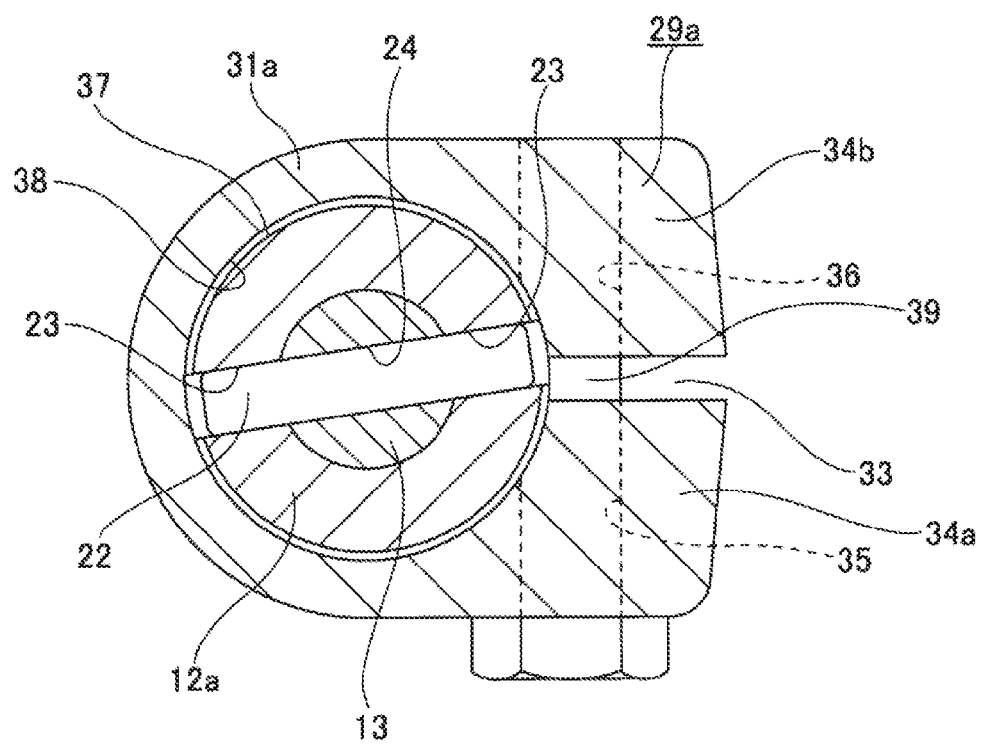
FIG. 6 is a cross sectional view taken along line VI-VI in FIG. 5.

A second embodiment of the present invention will be described with reference to FIGS. 5 and 6. In the case of this embodiment, the position and range of the one edge of the connecting pin 22 that can be visually observed from the outside of the yoke 29a differ from those of the first embodiment illustrated in FIGS. 1 to 3.

In the case of this embodiment, one width-direction half portion (upper half portion in FIG. 5) that is a part of the one edge of the connecting pin 22 is hidden by an inner diameter side of the other flange portion 34b at a part close to a front end of the discontinuous portion 33 of the base portion 31a of the yoke 29a, and only the other width-direction half portion (lower half portion in FIG. 5) that is the rest of the one edge of the connecting pin 22 is visible through the discontinuous portion 33 from the outside of the yoke 29a. In the case of this embodiment, a mutual positional relationship of the base portion 31a with respect to the output shaft 12a and the torsion bar 13 in relation to the circumferential direction differs from that according to the first embodiment (refer to FIG. 2) as illustrated in FIG. 6 in order for this configuration to be adopted.

The other configurations and effects are similar to those of the first embodiment.

Third Embodiment

Figure 7:
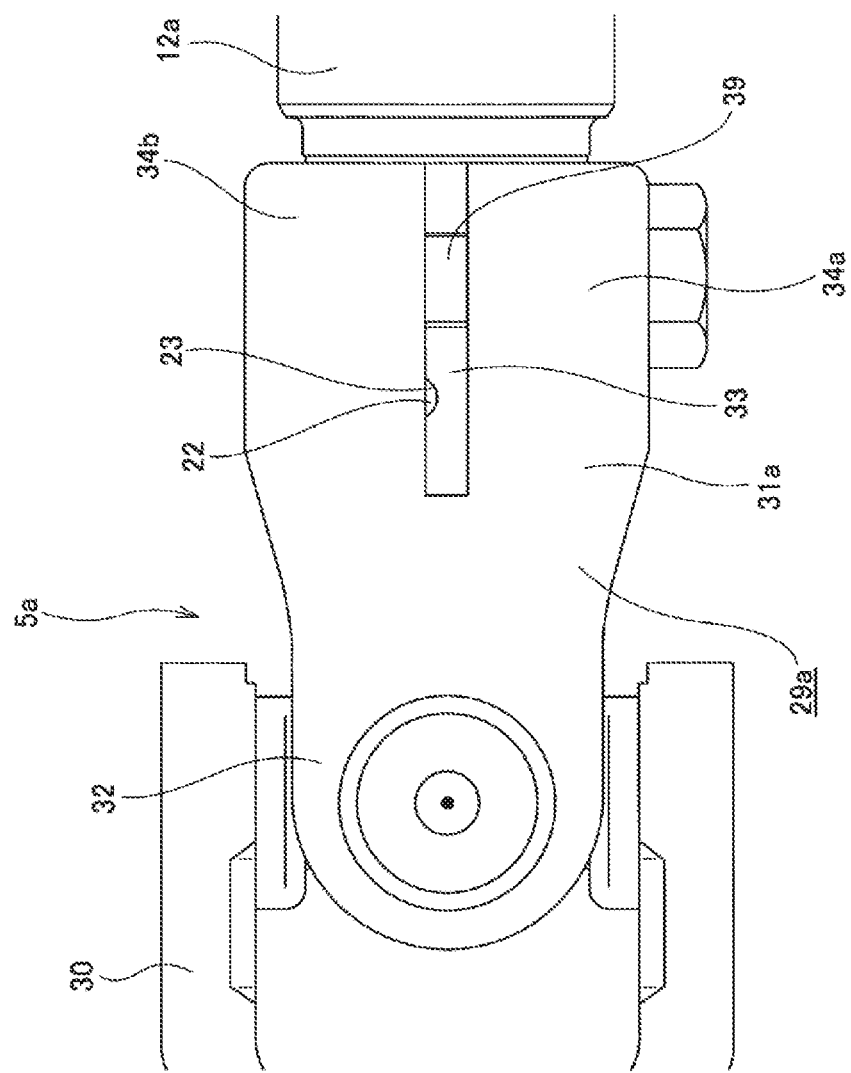
FIG. 7 is a drawing illustrating a third embodiment of the present invention, which is similar to FIG. 1.

A third embodiment of the present invention will be described with reference to FIG. 7. In the case of this embodiment, the position and range of the one edge of the connecting pin 22 that can be visually observed from the outside of the yoke 29a differ from those of the first embodiment illustrated in FIGS. 1 to 3, too.

In the case of this embodiment, one width-direction edge (upper edge in FIG. 7) to an intermediate portion that is a part of the one edge of the connecting pin 22 is hidden by the inner diameter side of the other flange portion 34b at the part close to the front end of the discontinuous portion 33 of the base portion 31a of the yoke 29a, and only the other radial edge (lower edge in FIG. 7) that is the rest of the one edge of the connecting pin 22 is visible through the discontinuous portion 33 from the outside of the yoke 29a.

The other configurations and effects are similar to those of the first and second embodiments.

Fourth Embodiment

Figure 8:
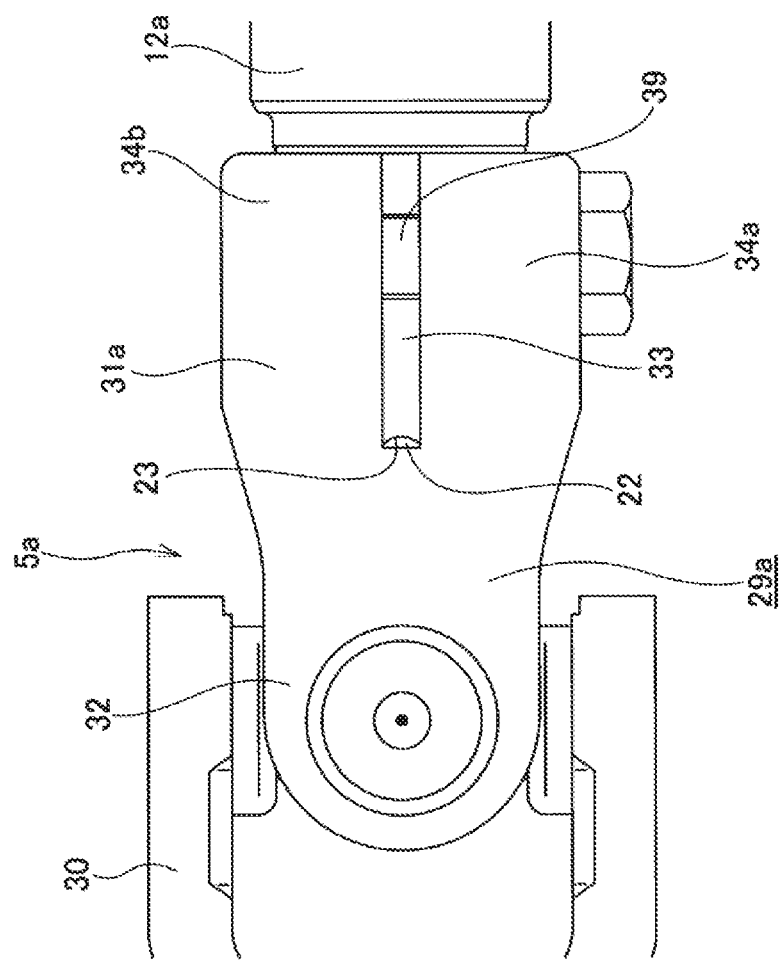
FIG. 8 is a drawing illustrating a fourth embodiment, which is similar to FIG. 1.

A fourth embodiment of the present invention will be described with reference to FIG. 8. In the case of this embodiment, the position and range of the one edge of the connecting pin 22 that can be visually observed from the outside of the yoke 29a differ from those of the first embodiment illustrated in FIGS. 1 to 3, too.

In the case of this embodiment, a front edge (left edge in FIG. 8) to the intermediate portion that is a part of the one edge of the connecting pin 22 is hidden by an inner diameter side of a front edge of the base portion 31a at a front end edge part of the discontinuous portion 33 of the base portion 31a of the yoke 29a, and only a rear edge (right edge in FIG. 8) that is the rest of the one edge of the connecting pin 22 is visible through the discontinuous portion 33 from the outside of the yoke 29a. In the case of this embodiment, an axial dimension of the front edge of the output shaft 12a is slightly extended forward in comparison to the case of the first embodiment and the place where the connecting pin 22 is installed (place where the outer diameter side through-hole 23 is formed) is slightly shifted forward in order for this configuration to be adopted.

The other configurations and effects are similar to those of the first embodiment.

Fifth Embodiment

Figure 9:
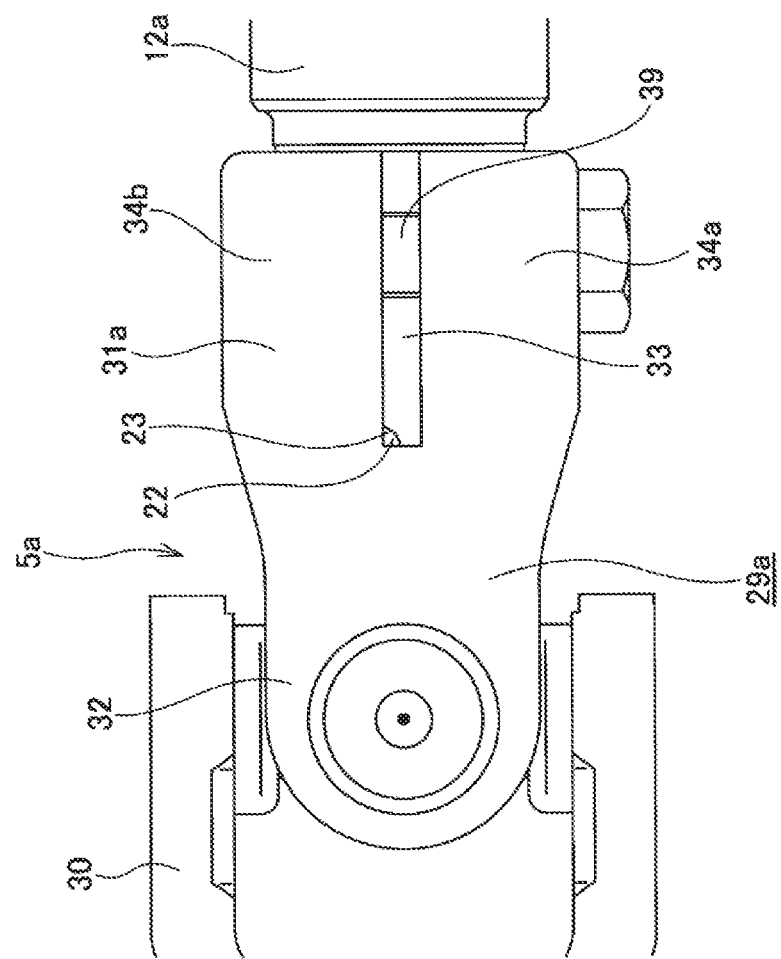
FIG. 9 is a drawing illustrating a fifth embodiment, which is similar to FIG. 1.

A fifth embodiment of the present invention will be described with reference to FIG. 9. In the case of this embodiment, the position and range of the one edge of the connecting pin 22 that can be visually observed from the outside of the yoke 29a differ from those of the first embodiment illustrated in FIGS. 1 to 3, too.

In the case of this embodiment, a substantially ¾ part that is a part of the one edge of the connecting pin 22 is hidden by the inner diameter sides of the front edge of the base portion 31a and the other flange portion 34b at the front end edge part of the discontinuous portion 33 of the base portion 31a of the yoke 29a, and only a substantially ¼ part that is the rest of the one edge of the connecting pin 22 is visible through the discontinuous portion 33 from the outside of the yoke 29a.

The other configurations and effects are similar to those of the first, second, and fourth embodiments.

Sixth Embodiment

Figure 10:
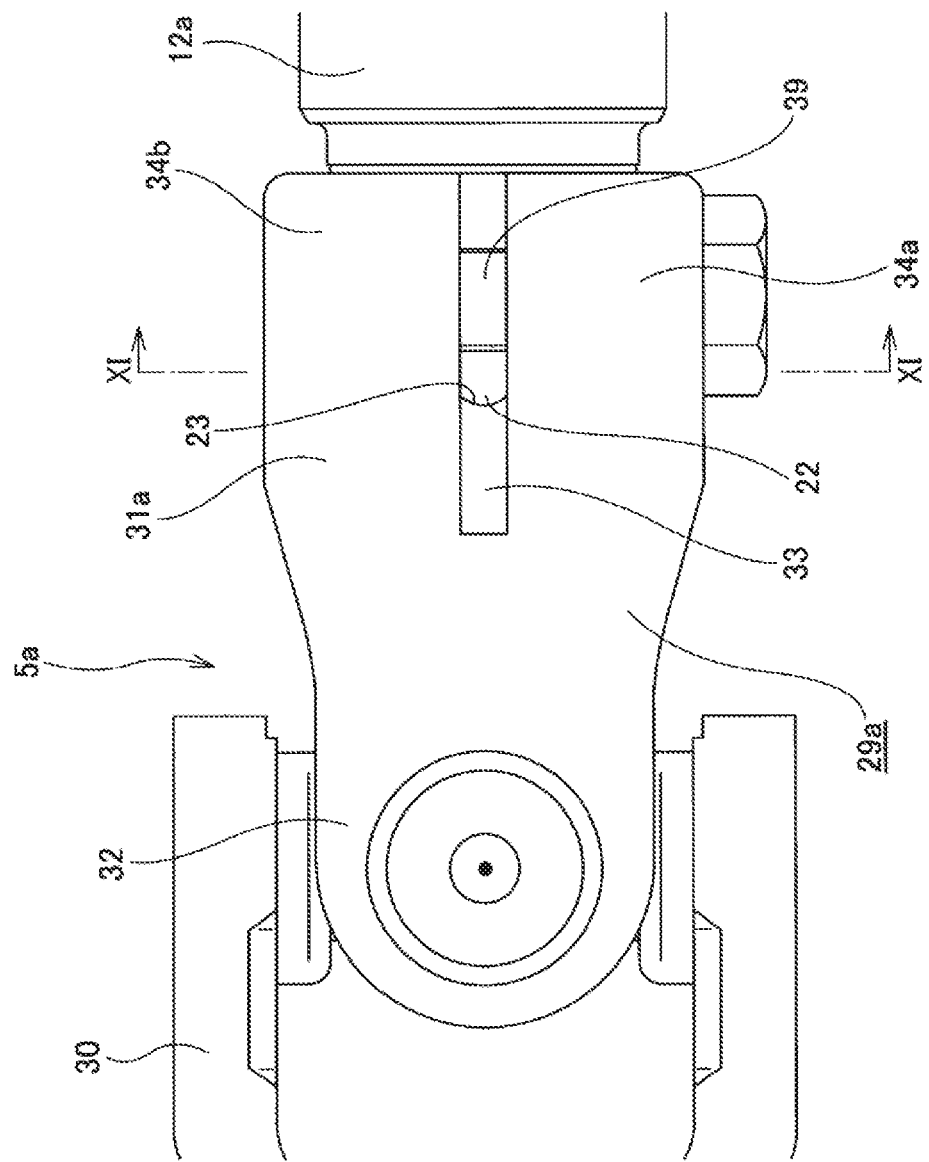
FIG. 10 is a drawing illustrating a sixth embodiment, which is similar to FIG. 1.
Figure 11:
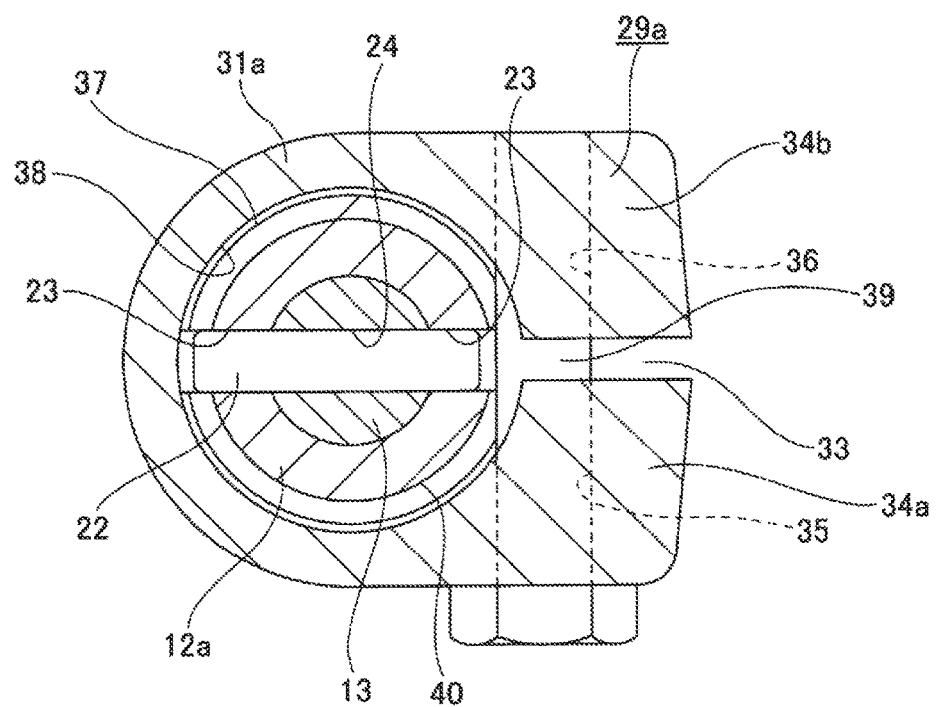
FIG. 11 is a cross sectional view taken along line XI-XI in FIG. 10.
Figure 12:
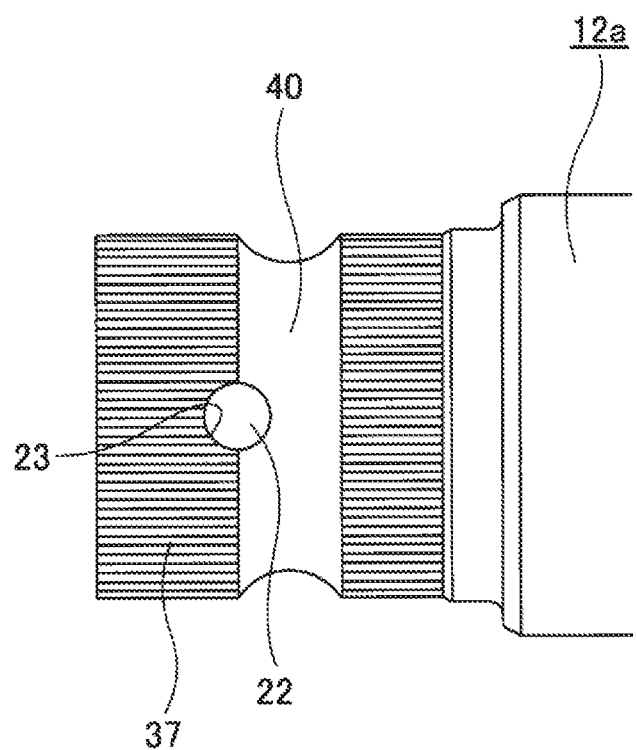
FIG. 12 is a plan view of the front edge of the output shaft.

A sixth embodiment of the present invention will be described with reference to FIGS. 10 to 12. In the case of this embodiment, the position and range of the one edge of the connecting pin 22 that can be visually observed from the outside of the yoke 29a differ from those of the first embodiment illustrated in FIGS. 1 to 3, too.

In the case of this embodiment, the front edge (left edge in FIG. 10) to the intermediate portion that is a part of the one edge of the connecting pin 22 is visible through the discontinuous portion 33 from the outside of the yoke 29a in a longitudinal intermediate portion of the discontinuous portion 33 of the base portion 31a of the yoke 29a whereas the rear edge (right edge in FIG. 10) that is the rest of the one edge of the connecting pin 22 is hidden by an inner diameter side of the rod portion of the bolt 39. In the case of this embodiment, the installation place of the connecting pin 22 with respect to the front edge of the output shaft 12a (place where the outer diameter side through-hole 23 is formed) is slightly shifted rearward in comparison to the case of the first embodiment in order for this configuration to be adopted. In addition, in the case of this embodiment, the rod portion of the bolt 39 is the displacement-regulating portion with respect to the one edge of the connecting pin 22.

The other configurations and effects are similar to those of the first embodiment.

Seventh Embodiment

Figure 13:
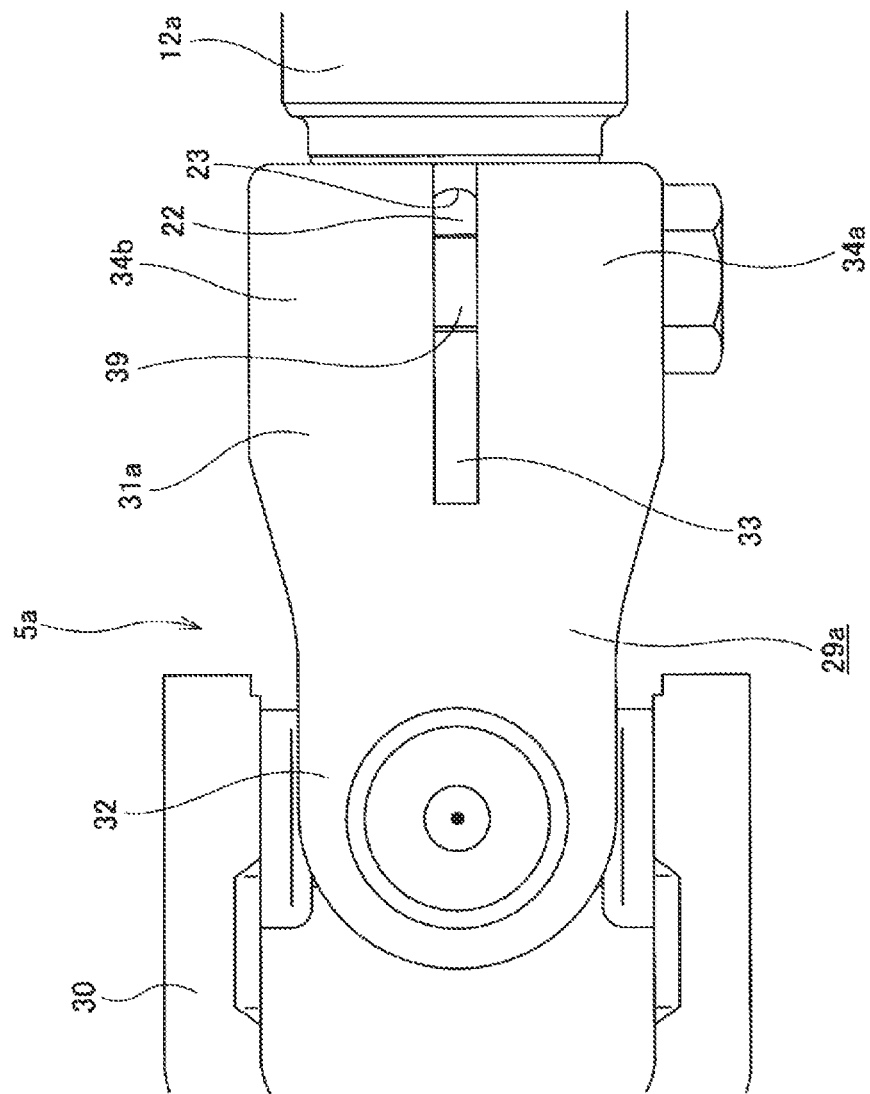
FIG. 13 is a drawing illustrating a seventh embodiment, which is similar to FIG. 1.

A seventh embodiment of the present invention will be described with reference to FIG. 13. In the case of this embodiment, the position and range of the one edge of the connecting pin 22 that can be visually observed from the outside of the yoke 29a differ from those of the first embodiment illustrated in FIGS. 1 to 3, too.

In the case of this embodiment, the rear edge (right edge in FIG. 13) to the intermediate portion that is a part of the one edge of the connecting pin 22 is visible through the discontinuous portion 33 from the outside of the yoke 29a at a rear edge of the discontinuous portion 33 of the base portion 31a of the yoke 29a whereas the front edge (left edge in FIG. 13) that is the rest of the one edge of the connecting pin 22 is hidden by the inner diameter side of the rod portion of the bolt 39. In the case of this embodiment, the rod portion of the bolt 39 is the displacement-regulating portion with respect to the one edge of the connecting pin 22, too.

The other configurations and effects are similar to those of the first and sixth embodiments.

Eighth Embodiment

Figure 14:
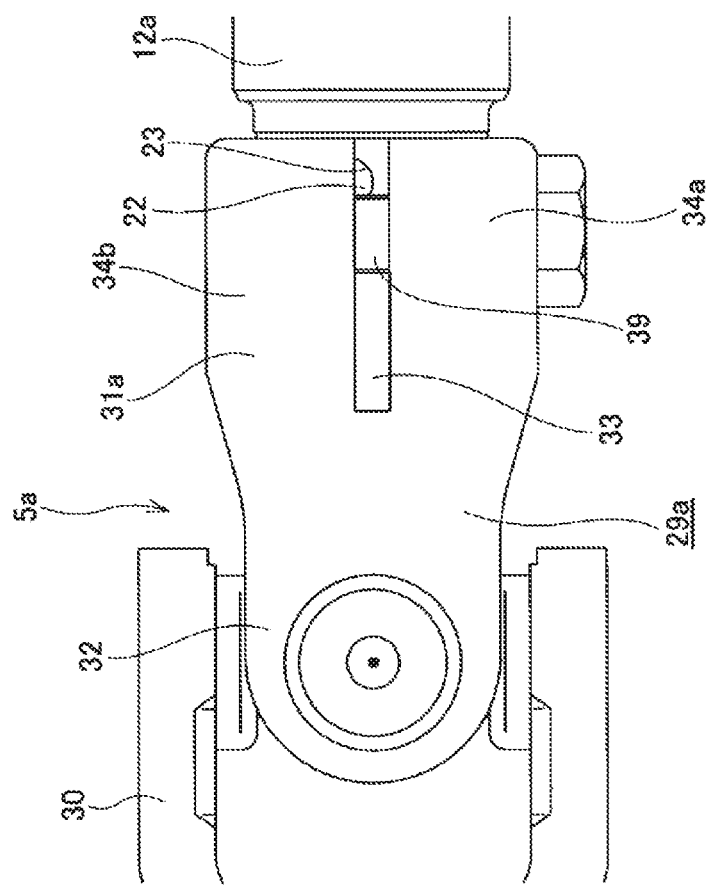
FIG. 14 is a drawing illustrating an eighth embodiment, which is similar to FIG. 1.

An eighth embodiment of the present invention will be described with reference to FIG. 14. In the case of this embodiment, the position and range of the one edge of the connecting pin 22 that can be visually observed from the outside of the yoke 29a differ from those of the first embodiment illustrated in FIGS. 1 to 3, too.

In the case of this embodiment, a substantially ⅔ part that is a part of the one edge of the connecting pin 22 is hidden by the inner diameter sides of the rod portion of the bolt 39 and the other flange portion 34b at the rear edge of the discontinuous portion 33 of the base portion 31a of the yoke 29a, and only a substantially ¼ part that is the rest of the one edge of the connecting pin 22 is visible through the discontinuous portion 33 from the outside of the yoke 29a. In the case of this embodiment, the rod portion of the bolt 39 is the displacement-regulating portion with respect to the one edge of the connecting pin 22, too.

The other configurations and effects are similar to those of the first, second, and seventh embodiments.

In the sixth to eighth embodiments in which the rod portion of the bolt 39 is the displacement-regulating portion, the axial displacement of the connecting pin 22 with respect to each of the outer diameter side and inner diameter side through-holes 23 and 24 can be sufficiently suppressed even in a case where the one edge of the connecting pin 22 is present at the position of the same phase as the discontinuous portion 33 in relation to the circumferential direction of the base portion 31a. In this case, the relationship between the diameter dimension $D_{22}$ of the connecting pin 22 and the width dimension $W_{33}$ of the discontinuous portion 33 is not limited to $W_{33}<D_{22}$.

Ninth Embodiment

Figure 15:
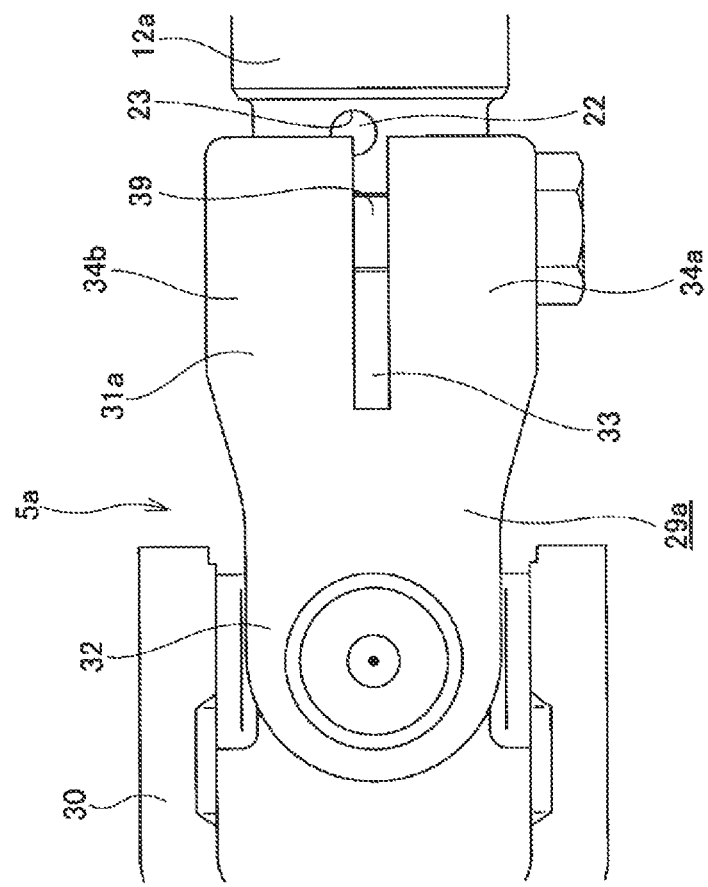
FIG. 15 is a drawing illustrating a ninth embodiment, which is similar to FIG. 1.
Figure 16A:
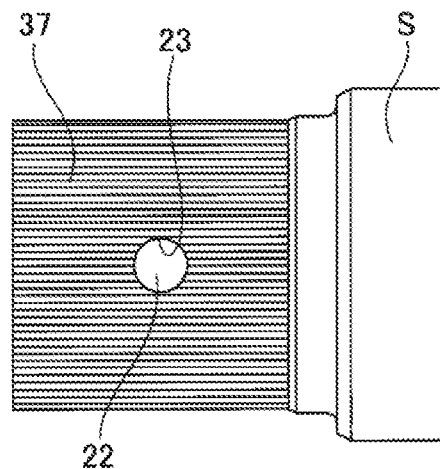
FIGS. 16A to 16C are plan views illustrating three examples of the front edge of a torque transmission shaft that can be adopted in a case where the present invention is carried out.
Figure 16B:
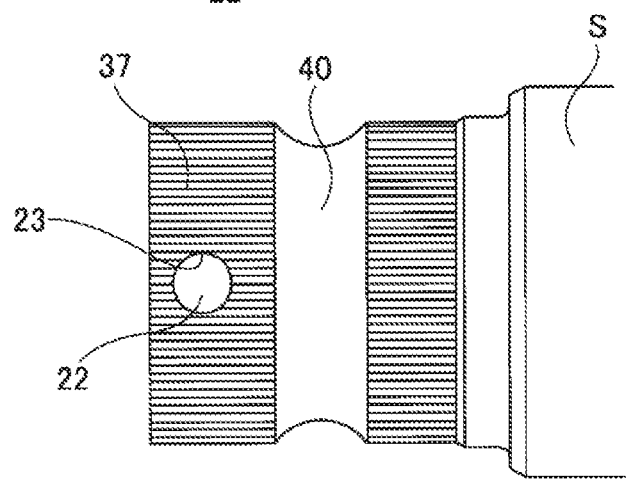
Figure 16C:
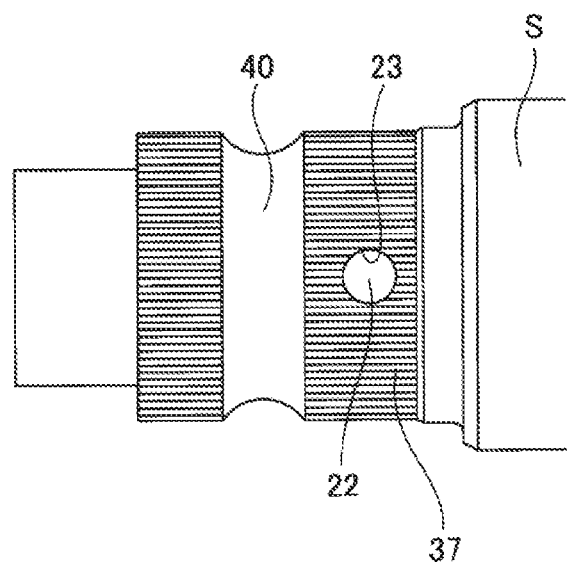

A ninth embodiment of the present invention will be described with reference to FIG. 15. In the case of this embodiment, the position and range of the one edge of the connecting pin 22 that can be visually observed from the outside of the yoke 29a differ from those of the first embodiment illustrated in FIGS. 1 to 3, too.

In the case of this embodiment, one width-direction half portion (upper half portion in FIG. 15) of a front half portion (left half portion in FIG. 15) of the one edge of the connecting pin 22 is hidden by the inner diameter side of the other flange portion 34b at a rear end edge part of the discontinuous portion 33 of the base portion 31a of the yoke 29a, and the other width-direction half portion (lower half portion in FIG. 15) of the front half portion of the connecting pin 22 is visible through the discontinuous portion 33 from the outside of the yoke 29a. In addition, a rear half portion of the connecting pin 22 (right half portion in FIG. 15) is positioned behind the base portion 31a, exposed to the outside, and visible. In the case of this embodiment, a rear half portion of the other edge of the connecting pin 22 is positioned behind the base portion 31a, exposed to the outside, and visible, too.

The other configurations and effects are similar to those of the first and second embodiments.

INDUSTRIAL APPLICABILITY

The torque transmission unit according to the present invention can be installed not only between a front edge of a steering shaft and a rear edge of an intermediate shaft but also between, for example, a front edge of the intermediate shaft and a pinion constituting a steering gear unit.

In addition, a power steering device that uses the torque transmission unit according to the present invention incorporated therein is not limited to an electric power steering device and may be a hydraulic power steering device. In this case, a position of auxiliary power application in the steering device is not particularly limited.

In other words, the torque transmission unit according to the present invention can be used by being incorporated into appropriate positions of electric or hydraulic power steering devices that have various known structures.

Figure 17A:
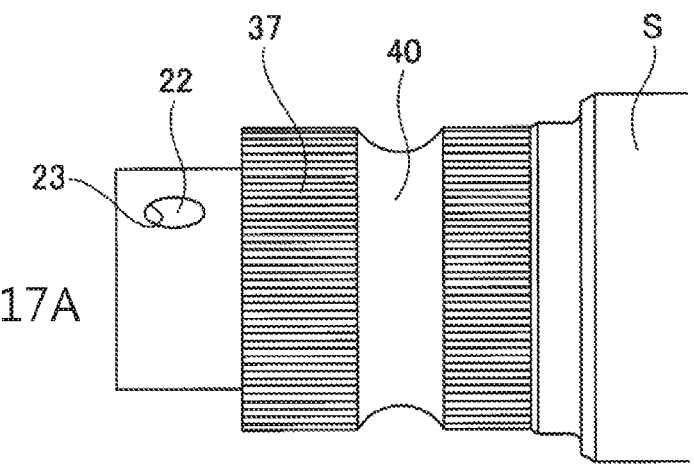
FIGS. 17A to 17C are plan views illustrating three more examples of the front edge of the torque transmission shaft that can be adopted in a case where the present invention is carried out.
Figure 17B:
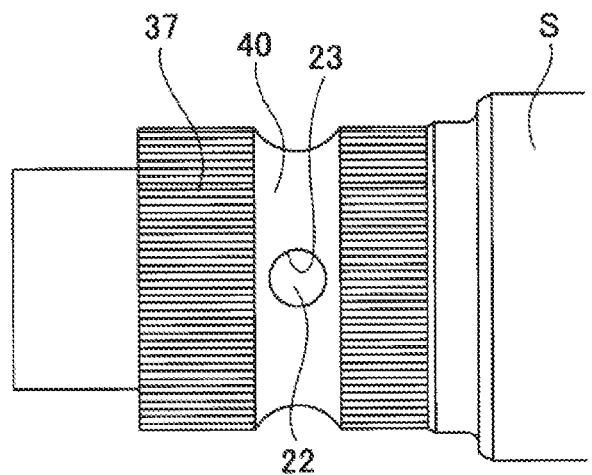
Figure 17C:
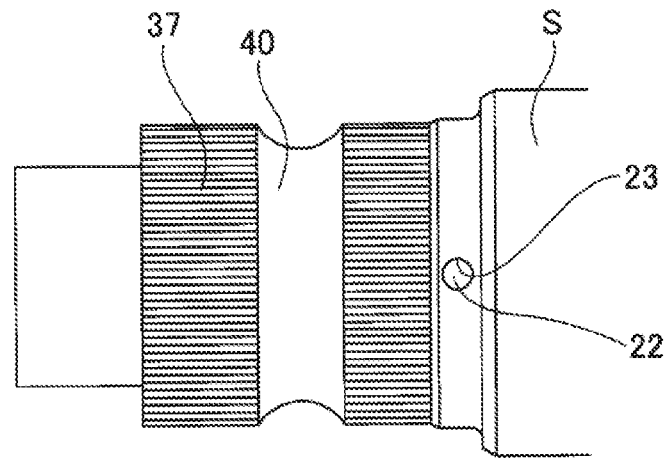
Figure 18A:
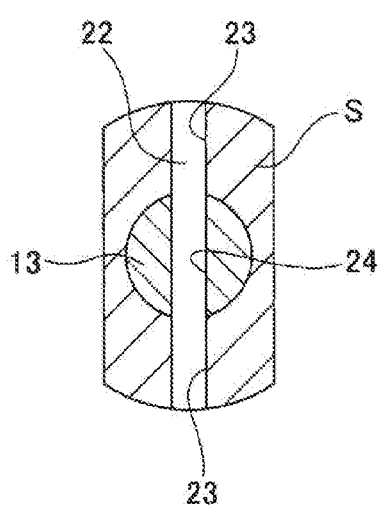
FIGS. 18A to 18D are lateral cross sectional views illustrating four examples of a structure of a portion for connecting the output shaft and a torsion bar to each other by using a connecting pin that can be adopted in a case where the present invention is carried out.
Figure 18B:
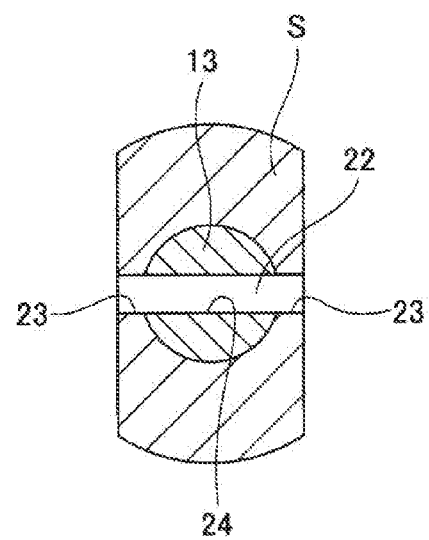
Figure 18C:
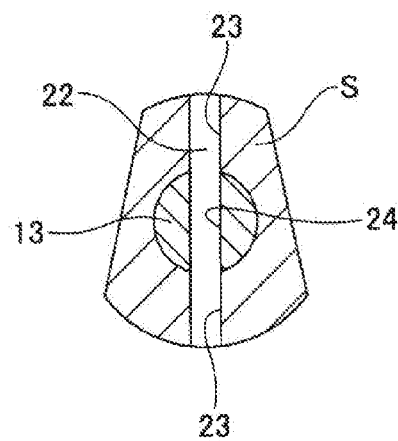
Figure 18D:
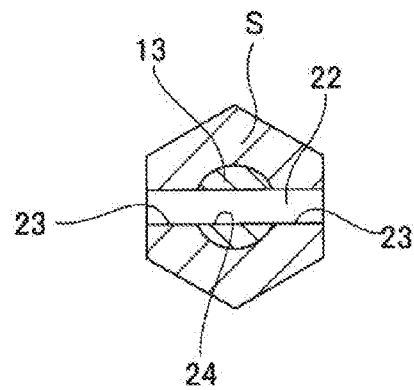

In a case where the present invention is carried out, a position of an opening portion of the outer diameter side through-hole 23 that is formed at one edge of a torque transmission shaft S may be a part of the male serration portion 37 (portion engaged with the female serration portion disposed on the inner peripheral surface of the base portion of the yoke) of the torque transmission shaft S (output shaft 12a) as illustrated in FIGS. 16(A) to 16(C) and 12 or may be a part separated from the male serration portion 37 of the torque transmission shaft S (portion not engaged with the female serration portion) as illustrated in FIGS. 17(A) to 17(C).

In the case of the former {FIGS. 16(A) to 16(C) and 12}, an end face of the connecting pin 22 that is viewed from the opening portion of the outer diameter side through-hole 23 and a surface of the male serration portion 37 significantly differ from each other in terms of light reflection direction, and thus, advantageously, the end face of the connecting pin 22 can be visually confirmed with ease (or the image diagnosis-based confirmation after the camera-based imaging is facilitated). In order for the ease of the confirmation in this case to become even more noticeable, it is preferable that processing for turning the end face of the connecting pin 22 into a smooth surface (such as mirror finish processing) is performed.

Even in a structure in which an edge of the outer diameter side through-hole 23 is open on a bottom surface of the locking groove 40 as illustrated in FIG. 17(B), the end face of the connecting pin 22 can be visually observed from the opening in some cases even when looking obliquely such that the bolt is avoided.

In a case where the present invention is carried out, a cross sectional shape of the outer peripheral surface of the one edge of the torque transmission shaft S is not particularly limited insofar as the shape allows torque transmission based on an engagement with the inner peripheral surface of the base portion of the yoke. For example, the cross sectional shape may be as illustrated in FIGS. 18(A) to 18(D).

In a case where the present invention is carried out, both of the edges of the connecting pin do not necessarily have to be present at the position visible through the discontinuous portion of the base portion of the yoke from the outside of the yoke. In other words, in a case where the present invention is carried out, a configuration can also be adopted in which a part of both edges of the connecting pin is exposed to the outside from a base end edge of the base portion (positioned further on the other end side of the torque transmission shaft than the base end edge of the base portion) in a state where the mutual phases of the discontinuous portion of the base portion of the yoke and both edges of the connecting pin in relation to the circumferential direction are shifted from each other. In a case where this configuration is adopted, the part of both edges of the connecting pin that is exposed to the outside is visible from the outside of the yoke. In a case where this configuration is adopted, the width dimension of the discontinuous portion of the base portion may be less than the diameter dimension of the connecting pin or may be at least this diameter dimension.

The disclosure of Japanese Patent Application No. 2014-052423 filed on Mar. 14, 2014 and the disclosure of Japanese Patent Application No. 2014-124442 filed on Jun. 17, 2014 including the specification, drawings and abstract are incorporated herein by reference in their entirety.

REFERENCE SIGNS LIST

1 Steering wheel
2 Steering shaft
3 Steering column
4 Electric assist device
5a, 5b Universal joint
6 Intermediate shaft
7 Steering gear unit
8 Input shaft
9 Tie rod
10 Electric motor
11 Housing
12, 12a Output shaft
13 Torsion bar
14 Torque detector
15 Worm-type speed reducer
16 Lid
17 Main body
18 Bolt
19 Ball bearing
20 Ball bearing
21 Coupling hole portion
22 Connecting pin
23 Outer diameter side through-hole
24 Inner diameter side through-hole
25 Uneven portion for torque detection
26 Sleeve for torque detection
27 Coil unit for torque detection
28 Worm wheel
29, 29a Yoke
30 Yoke
31, 31a Base portion 32 Arm portion
33 Discontinuous portion (slit)
34a, 34b Flange portion
35 Through-hole
36 Screw hole
37 Male serration portion
38 Female serration portion
39 Bolt
40 Locking groove

The invention claimed is:

1. A torque transmission unit comprising:
a torque transmission shaft formed to have a hollow shape and including outer diameter side through-holes formed concentrically to each other and in a radial direction at two positions of one edge on sides opposite to each other in the radial direction;
a torsion bar inserted into an inner diameter side of the torque transmission shaft and including a inner diameter side through-hole formed in the radial direction at a position aligned with the outer diameter side through-hole on the one edge;
a connecting pin inserted into the outer diameter side through-hole and the inner diameter side through-hole in a state of being laid across between the outer diameter side through-hole and the inner diameter side through-hole;
a yoke including a base portion having a discontinuous portion at one place in a circumferential direction and having a partially cut cylindrical shape, the base portion having a pair of flange portions formed at a position where the discontinuous portion is pinched and a pair of mounting holes formed at positions aligned with the pair of flange portions; and
a bolt inserted into or screwed with the mounting hole and narrowing a width of the discontinuous portion in a state where the base portion of the yoke is externally fitted into the one edge of the torque transmission shaft such that the base portion is coupled with and fixed to the one edge of the torque transmission shaft,
wherein a state where the connecting pin is laid across between at least one of the outer diameter side through-holes and the inner diameter side through-hole is maintained by an axial displacement of the connecting pin with respect to the outer diameter side through-hole and the inner diameter side through-hole being regulated based on an engagement between both edges of the connecting pin and a displacement-regulating portion which is a part of the yoke or the bolt, and
wherein at least one of the edges of the connecting pin is present at a position visible from an outside of the yoke.

2. The torque transmission unit according to claim 1, wherein the displacement-regulating portion with respect to the one edge of the connecting pin is an inner peripheral surface of the base portion or a rod portion of the bolt, and the displacement-regulating portion with respect to the other edge of the connecting pin is the inner peripheral surface of the base portion, and wherein a state where the connecting pin is laid across between the outer diameter side through-hole and the inner diameter side through-hole is maintained by an axial displacement of the connecting pin with respect to the outer diameter side through-hole and the inner diameter side through-hole being regulated based on an engagement between both edges of the connecting pin and both of the displacement-regulating portions.

3. The torque transmission unit according to claim 1, wherein a width dimension of the discontinuous portion of the base portion is smaller than a diameter dimension of the connecting pin.

4. A torque transmission unit comprising:
a torque transmission shaft formed to have a hollow shape and including outer diameter side through-holes formed concentrically to each other and in a radial direction at two positions of one edge on sides opposite to each other in the radial direction;
a torsion bar inserted into an inner diameter side of the torque transmission shaft and including a inner diameter side through-hole formed in the radial direction at a position aligned with the outer diameter side through-hole on the one edge;
a connecting pin inserted into the outer diameter side through-hole and the inner diameter side through-hole in a state of being laid across between the outer diameter side through-hole and the inner diameter side through-hole;
a yoke including a base portion having a discontinuous portion at one place in a circumferential direction and having a partial cut cylindrical shape, the base portion having a pair of flange portions formed at a position where the discontinuous portion is pinched and a pair of mounting holes formed at positions aligned with the pair of flange portions; and
a bolt inserted into or screwed with the mounting hole and narrowing a width of the discontinuous portion in a state where the base portion of the yoke is externally fitted into the one edge of the torque transmission shall such that the base portion is coupled with and fixed to the one edge of the torque transmission shalt,
wherein a state where the connecting pin is laid across between at least one of the outer diameter side through-holes and the inner diameter side through-hole is maintained by an axial displacement of the connecting pin with respect to the outer diameter side through-hole and the inner diameter side through-hole being regulated based on an engagement between both edges of the connecting pin and a displacement-regulating portion which is a part of the yoke or the bolt,
wherein a width dimension of the discontinuous portion of the base portion is smaller than a diameter dimension of the connecting pin, and
wherein the one edge of the connecting pin is present at a position visible through the discontinuous portion from the outside of the yoke.

* * * * *